(12) United States Patent
Feng et al.

(10) Patent No.: US 6,356,672 B1
(45) Date of Patent: Mar. 12, 2002

(54) METHOD AND APPARATUS FOR REDUCING THE COLOR REGISTRATION ARTIFACT OF IMAGE CAPTURE DEVICES

(75) Inventors: Xiaofan Feng, Vancouver; Scott J. Daly, Kalama, both of WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 0 days.

(21) Appl. No.: 09/263,931

(22) Filed: Mar. 8, 1999

(51) Int. Cl.$^7$ .................................................. G06K 7/00
(52) U.S. Cl. ...................................... 382/312; 358/520
(58) Field of Search ............................... 358/509, 520, 358/515, 516; 382/312; 348/234

(56) References Cited

U.S. PATENT DOCUMENTS

| | | |
|---|---|---|
| 4,018,528 A | 4/1977 | Dennis |
| 4,080,623 A | 3/1978 | Needs |
| 4,139,797 A | 2/1979 | Rowe |
| 4,500,916 A | 2/1985 | Nabulsi |
| 4,546,700 A | 10/1985 | Kishner et al. |
| 4,733,296 A | 3/1988 | Honbo et al. |
| 4,835,594 A | 5/1989 | Kihara |
| 4,891,548 A | 1/1990 | Palac |
| 4,908,720 A | 3/1990 | Nagumo |
| 5,040,026 A | 8/1991 | Jamzadeh et al. |
| 5,084,761 A | 1/1992 | Nitta |
| 5,170,250 A | 12/1992 | Ledebuhr |
| 5,283,858 A | 2/1994 | Moellering et al. |
| 5,287,160 A | 2/1994 | Dastin et al. |
| 5,325,154 A | 6/1994 | Tayama et al. |
| 5,355,154 A | 10/1994 | Guerin |
| 5,406,066 A * | 4/1995 | Steinle .................. 2505/208.1 |
| 5,410,347 A * | 4/1995 | Steinle ....................... 348/270 |
| 5,412,409 A | 5/1995 | Costanza |
| 5,412,577 A | 5/1995 | Sainio et al. |
| 5,495,313 A * | 2/1996 | Kai ............................ 354/408 |
| 5,523,823 A | 6/1996 | Ashikaga |
| 5,544,284 A * | 8/1996 | Allebach .................... 395/131 |
| 5,550,625 A | 8/1996 | Takamatsu et al. |
| 5,550,660 A | 8/1996 | Yang |
| 5,682,180 A | 10/1997 | Young et al. |
| 5,689,425 A | 11/1997 | Sainio et al. |

(List continued on next page.)

FOREIGN PATENT DOCUMENTS

| | | | | |
|---|---|---|---|---|
| EP | 0926901 A2 * | 6/1999 | ............ | H04N/9/04 |
| JP | 02000270230 A * | 9/2000 | ............ | H04N/1/48 |

Primary Examiner—Jerome Grant, II
(74) Attorney, Agent, or Firm—Robert D. Varitz, P.C.

(57) ABSTRACT

A method for color registration in a image capturing device includes arranging multiple rows and multiple columns of pixel capturing elements in a sensor array; capturing a luminance component of the image and generating a luminance output signal therefrom; capturing in another row and in alternate columns thereof, a first color component, capturing a luminance component in the remaining columns thereof, and generating a first color-luminance output signal therefrom; and capturing, in another row and in alternate columns thereof, a second color component, capturing a luminance component in the remaining columns thereof, and generating a second color-luminance output signal therefrom. A system for color registration in a image capturing device includes a sensor array having multiple rows and multiple columns of pixel capturing elements therein, wherein a first row has pixel capturing elements for capturing a luminance component of the image at a first resolution; another row and alternate columns thereof have pixel capturing elements for capturing a first color component at one-half of said first resolution, and which contain pixel capturing elements in the remaining columns thereof for capturing a luminance component thereof; and another row and alternate columns thereof have pixel capturing elements for capturing a second color component at one-half said first resolution, and which contain pixel capturing elements in the remaining columns thereof for capturing a luminance component thereof.

8 Claims, 3 Drawing Sheets

U.S. PATENT DOCUMENTS

| | | |
|---|---|---|
| 5,715,498 A | 2/1998 | Takeuchi et al. |
| 5,737,003 A | 4/1998 | Moe et al. |
| 5,760,815 A | 6/1998 | Genovese |
| 5,773,814 A | 6/1998 | Phillips et al. |
| 5,774,156 A | 6/1998 | Guerin |
| 6,075,889 A * | 6/2000 | Hamilton, Jr. .............. 382/167 |
| 6,133,953 A * | 10/2000 | Okada ........................ 348/272 |

* cited by examiner

METHOD AND APPARATUS FOR REDUCING THE COLOR REGISTRATION ARTIFACT OF IMAGE CAPTURE DEVICES

FIELD OF THE INVENTION

This invention relates to improvements in document scanning for photocopiers, scanners, and other image reproducing systems, and specifically to a method of refining color registration within the final image.

BACKGROUND OF THE INVENTION

Scanners generally capture color images using three sensors: red(R), green(G), and blue(B). For most desktop scanners, this is accomplished by a 3-row CCD sensor. Each row is offset in the slow-scan direction (or called sub-direction, the direction of scan bar movement) by a few scanlines, and each row is responsible for capturing only one color. Each row is also slightly offset in the fast-scan direction due to manufacturing misalignment, i.e., the manufacturing process must, of necessity, set tolerance levels that are less than perfect. The captured data are recombined digitally to form a red-green-blue (RGB) image. Because the 3 rows of the CCD are separated in the slow scan direction, the recombined RGB planes of the image do not align perfectly. This misalignment in color channels is referred to as a color mis-registration and it results in color fringes about black text, and reduced sharpness. In order to avoid these scanning artifacts, sophisticated algorithms and circuitry are needed to correct this color registration problem. For example, some systems have special hardware to segment the black text from others, and a special algorithm is employed to reduce the color fringe artifacts caused by color registration. This increases the number of gates required in the image processing ASIC, and thus increases the cost of the system.

There are many other approaches to reduce color mis-registration in the patent literature. Some employ mechanical or optical means to reduce the amount of color mis-registration. Some employ software algorithms to detect the color registration error and correct it in software.

Color registration has always been a problem in color image capture, both for color scanners and for color cameras. Because the sensitivity and spatial bandwidth of human vision for luminance is much higher than that for chrominance, it is intuitive to devise some scheme to capture luminance and chrominance separately. R. W. G. Hunt described the concept of a red, luminance, and blue (R-Y-B) camera in *The Reproduction of Colour*, Fifth Edition, Fountain Press, 1995. Light from the objective lens is split into three beams: red (R), luminance (Y), and blue (B). Three plumbicon tubes are used to capture the R-Y-B image. The advantage, in terms of color registration, is not found, in practice, to be as large as expected, because the human eye seems to be very sensitive to color fringes around edges in a picture. The main reason for the failure in the R-Y-B capture process as described by Hunt is that the chrominance signal is not captured independent of the luminance in Hunt's system. The chrominance signals is derived from red, blue, and luminance signals (R-Y, and Y-B), which are shifted relative to each other. Mis-registration in R and Y or B and Y produces a sharp change at edges, which causes color fringing.

Referring now to FIG. 1, several simulated images formed by a color scanner are depicted. FIG. 1a depicts an original image at 10; FIG. 1b represents an image formed by a 2-pixel vertical shift in the red component in a RGB image at 12; while FIG. 1c represents an image representing a 2-pixel vertical shift in an RYB image at 14. FIGS. 1b and 1c have color fringes located above and below the black portion of the image, with an upper fringe 15 of FIG. 1b being a cyan artifact, and a lower fringe 16 being a red artifact. In FIG. 1c, an upper fringe 17 is a green artifact while a lower fringe 18 is a red artifact. It is apparent that although the R-Y-B scanner improves the sharpness of text, the color fringing still exists.

There is substantial prior art addressing the problem of color mis-registration for both image input and image output devices. The known prior art the input devices addresses the capture of still images, typically, hard copy scanners and electrophotographic engines, and moving images in video camera applications. Of the still imaging techniques, there are those that are strictly mechanical, such as described in U.S. Pat. No. 5,737,003, which detects the belt position of an electrophotographic process and adjusts it to prevent color mis-registration. There are also techniques which mechanically detect components of the system that would cause mis-registration, but rather than correcting the mechanical problem, the correction is applied to another component of the imaging process, as described in U.S. Pat. No. 5,412,409. One of the more common techniques is to use a registration pattern, as described in U.S. Pat. Nos. 5,774,156, and 5,760,815, both of which describe the use of fiber optics to image a pattern onto the sensor.

Once the registration pattern is detected and analyzed by color components, attempts are made to correct the mis-registration problem, via mechanical adjustment, as described in U.S. Pat. Nos. 5,410,347 and 5,325,154, or by adjusting the digital image, as described in U.S. Pat. Nos. 5,550,625 and 5,523,823. Sometimes a color registration error is detected without using registration patterns, such as by using an image border, as described in U.S. Pat. No. 5,406,066.

Other color registration techniques are used in connection with video cameras, and include those that correct for mis-registration due to chroma aberration by modifying scanning beam deflection circuitry, such as U.S. Pat. No. 5,715,498, and those that correct for registration problems due to tube geometry and optics, such as U.S. Pat. No. 4,733,296. A technique that corrects for the color mis-registration caused by color filter wheel imperfections in a system using RGB line sequential color uses a line scan offset method is described in U.S. Pat. No. 5,084,761. A technique that uses an alignment beam for sensing color mis-registration and correcting the image from the alignment beam is described in U.S. Pat. No. 4,080,623. A technique for solid-state cameras using 2D CCD arrays which detect positions of R and B images and offset the R and B images to align with the G image is described in U.S. Pat. No. 4,908,720. Other techniques attempt to make local corrections of color mis-registration, such as that described in U.S. Pat. No. 4,835,594, wherein a 2D pattern is used to correct for a variety of optic and tube spatial problems. Other correction techniques require camera calibration during the manufacturing process. Another technique is to sense color mis-registration from a live image and correct the registration with a small delay, while storing a history of the dynamic properties of the color mis-registration to aid in real-time correction, as described in U.S. Pat. No. 4,500,916.

The prior art for solutions to color mis-registration in output devices, such as printers and displays, include solely mechanical designs to prevent mis-registration, such as U.S. Pat. No. 5,287,160 for electrophotography applications; U.S. Pat. No. 5,040,026 for thermal printers; and those for CRT manufacturing, U.S. Pat. Nos. 4,891,548 and 4,139,797, for a shadow mask design; and U.S. Pat. No. 4,065,695 for a CRT charge aperture. There is also a technique in the printing art that monitors the output prints with a camera and then mechanically offsets the individual plates of the offset printing press, generally with a slight delay in the mass printing process, as described in U.S. Pat. Nos. 5,689,425 and 5,412,577. As in the input imaging art, the use of registration marks is common, as described in U.S. Pat. Nos. 4,546,700 and 4,018,528, and as described in U.S. Pat. No. 5,355,154, wherein a registration pattern is placed outside of the image border. Similarly, U.S. Pat. No. 5,170,250, describes a display device that uses an alignment beam. Another approach is to detect and correct the color registration problem solely with image processing techniques, without the use of registration patterns, as described in U.S. Pat. No. 4,583,116. Image processing techniques may be applied to either during image capture or the image display.

Imaging systems based on visual opponent color mechanisms are known. One of these incorporates a display using two LCD panels having visual opponent color models, U.S. Pat. No. 5,682,180. Another describes a visualization color selection scheme using opponent color models, U.S. Pat. No. 5,283,858, while yet another describes a supertwisted nematic liquid crystal cell (STN) device capable of modulating light in accord with opponent color representations of images, U.S. Pat. No. 5,550,660. All of these references describe systems having displays, as opposed to scanners, and none address the problems of color registration.

U.S. Pat. No. 5,773,814 describes the use of Y and W components interleaved in one one-dimensional array, and G and C components interleaved in another, but does so for the sole purpose of optimizing light collection and maximizing signal-to-noise ratio (SNR) to allow for faster scan times, not to prevent or correct color mis-registration.

All of the known techniques set forth to solve color registration problems either attempt to mechanically prevent the problem or correct the image after the fact. None take an approach wherein the image is captured in a color domain, where the registration is substantially less visible, by taking into account knowledge of the spatial properties of the human color visual system. Further, all of the known references that attempt to use properties of the human visual system address problems other than color registration in a scanner.

SUMMARY OF THE INVENTION

A method for color registration in a image capturing device includes arranging multiple rows and multiple columns of pixel capturing elements in a sensor array; capturing a luminance component of the image and generating a luminance output signal therefrom; capturing in another row and in alternate columns thereof, a first color component, capturing a luminance component in the remaining columns thereof, and generating a first color-luminance output signal therefrom; and capturing, in another row and in alternate columns thereof, a second color component, capturing a luminance component in the remaining columns thereof, and generating a second color-luminance output signal therefrom.

A system for color registration in a image capturing device includes a sensor array having multiple rows and multiple columns of pixel capturing elements therein, wherein a first row has pixel capturing elements for capturing a luminance component of the image at a first resolution; another row and alternate columns thereof have pixel capturing elements for capturing a first color component at one-half of said first resolution, and which contain pixel capturing elements in the remaining columns thereof for capturing a luminance component thereof; and another row and alternate columns thereof have pixel capturing elements for capturing a second color component at one-half said first resolution, and which contain pixel capturing elements in the remaining columns thereof for capturing a luminance component thereof.

It is an object of the invention to capture luminance and chrominance separately and independently, so that the captured image is free from color fringing and blurring associated with mis-registration.

Another object of the invention is to provide a system for capturing luminance and chrominance separately and independently, so that the captured image is free from color fringing and blurring associated with mis-registration.

A further object of the invention is to provide a method for capturing luminance and chrominance separately and independently, so that the captured image is free from color fringing and blurring associated with mis-registration.

These and other objects and advantages of the invention will become more fully apparent as the description which follows is read in conjunction with the drawings.

DETAILED DESCRIPTION OF THE PREFERRED EMBODIMENT

Scanning systems typically incorporate charge-coupled devices (CCD) having a grid of imaging elements, or sensors, therein. Each imaging element detects a specific portion, or component, of an image, and are typically arranged such that a single row or column of elements detects a specific image color component. Due to the 3-row CCD capturing process, there is always registration error between the rows of sensor. The goal of this invention is to capture luminance and chrominance separately and independently, so that the captured image is free from color fringing and blurring associated with mis-registration.

The approach of this invention is to capture the image in a color domain where the registration is substantially less visible by taking into account knowledge of the spatial properties of the color visual system. By taking advantage of the lower bandwidth of human visual system to chrominance signals, this approach increases the tolerance for registration error. Even though this application is intended for use in scanners using three one-dimensional sensors, the invention may be used in many different types of imaging applications.

A red-luminance-blue (RYB) image capture system and method of using the same, reduces artifacts during color registration, by capturing color images as directly as possible in an opponent color domain. RYB color filters were suggested for use in full-frame, or full-field, capture in video over thirty years ago, by Hunt, described above. Hunt's technique, however, has not been applied to scanners nor to modern video. Unlike Hunt, the invention described herein uses R, Y and B filters to cover the sensor pixels, but solely as a way of forming Y, R-Y, and B-Y images. The combination of the R and Y, as well as the B and Y to form the difference images may be done on the sensor prior to the AND step, thus rendering the sensor as a virtual Y, R-Y, and B-Y sensor.

A key feature of the invention is the use of color interleaving with three ID sensors, wherein one sensor captures only the luminance, Y, one sensor captures R interleaved with Y, and the third sensor captures B interleaved with Y.

The physiological basis of the invention is the property of the human visual system (HVS) that derives from opponent color mechanisms within the neurophysiology of the HVS. The main properties that arise from the opponent color mechanisms are the differences in bandwidth and sensitivity for the visual systems spatial frequency behavior, as measured in the contrast sensitivity functions (CSF), where the luminance channel has the highest bandwidth and sensitivity, and the RG bandwidth and sensitivity are about ½ that of the luminance, and the BY properties are even further diminished.

Figure 1:
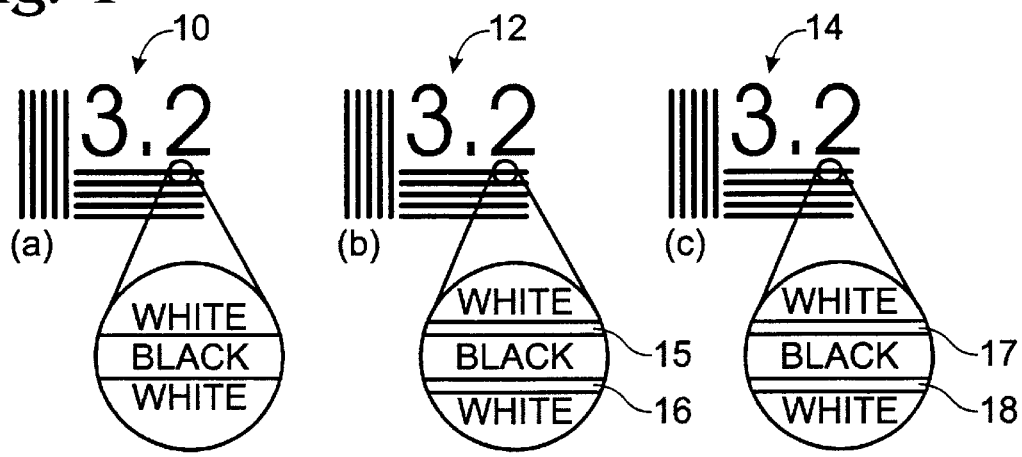
FIG. 1 shows the results of a simulation of the R-Y-B capturing system of the invention in a color scanning system.
Figure 2:
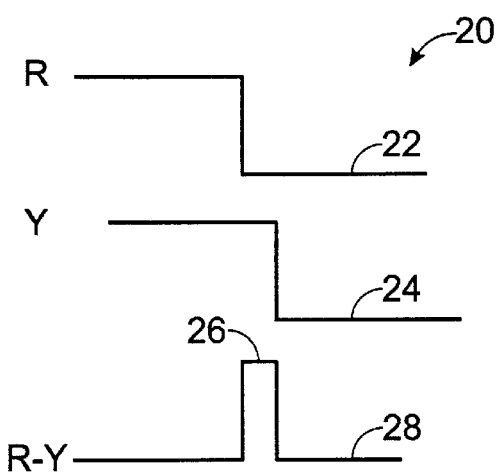
FIG. 2 depicts a false color signal in a black-and-white image due to mis-registration in a R-Y-B based camera.

FIG. 2 illustrates color fringing in RYB camera for a B/W edge, generally at 20. A registration shift between R channel 22 and Y channel 24 causes a false color edge 26 in the RY chrominance channel 28. The key to reducing color registration error is to capture the luminance signal and chrominance signal independently.

Figure 3:
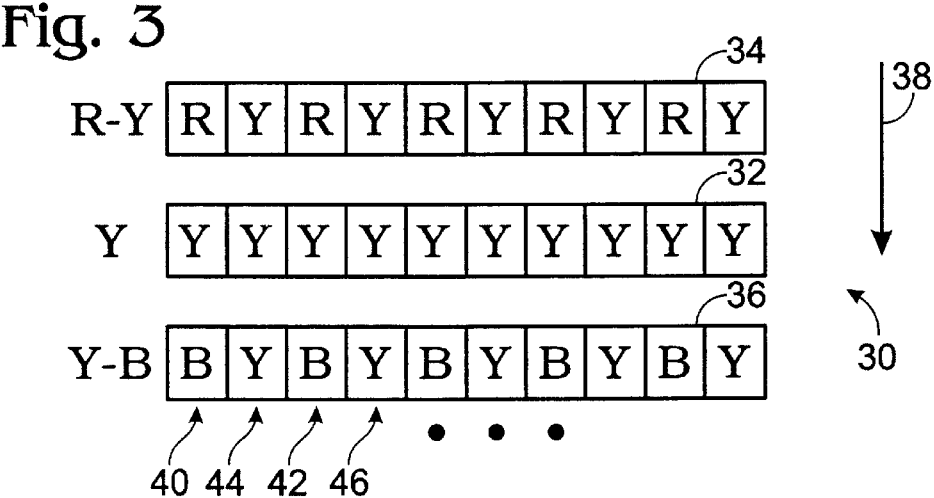
FIG. 3 depicts a sensor arrangement of the invention on a CCD focal plane.

This can be accomplished with the sensor arrangement shown in FIG. 3, generally at 30. Instead of capturing R and B at the same resolution as luminance, the R and B components are captured at half of the luminance resolution in the fast scan direction. This is based on properties of the HVS, and specifically, of the HVS visual frequency sensitivity for RG, RY and BY isoluminant signals, where the bandwidth of these isoluminant signals is less than ½ that of the luminance. One approach may be to increase the pixel size for the R and B rows, however, in the preferred embodiment, the same pixel size is maintained as for the Y row, and Y sensors are inserted between R and B sensors.

Multiple rows of pixel-capturing elements, or sensors, and multiple columns of sensors are arranged in a sensor array, which, in the preferred embodiment, is depicted at 30. A center, or first, row 32 captures only luminance components of the image at a predetermined, or first, resolution, forming a luminance output signal. Another row 34 captures a first color component at one-half the first resolution, red in this example, but only in alternate columns 40, 42 of the row. The remaining columns of sensors 44, 46, etc., in the row capture a luminance component, forming, in this example, a RY chrominance output signal. The remaining row, 36 captures a second color component, also at one-half the first resolution, blue in this case, in columns 40, 42, and a luminance component is captured in the remaining columns 44, 46 of the rows, forming a BY chrominance signal. In this embodiment, the sensors have a slow-scan direction represented by arrow 38. The chrominance signal, RY and BY, is only derived from the sensor response on the same row. Because there is no registration error between R and Y on the same row beside the fixed shift in the fast scan direction, the false color signal around B/W edges is eliminated.

Figure 4:
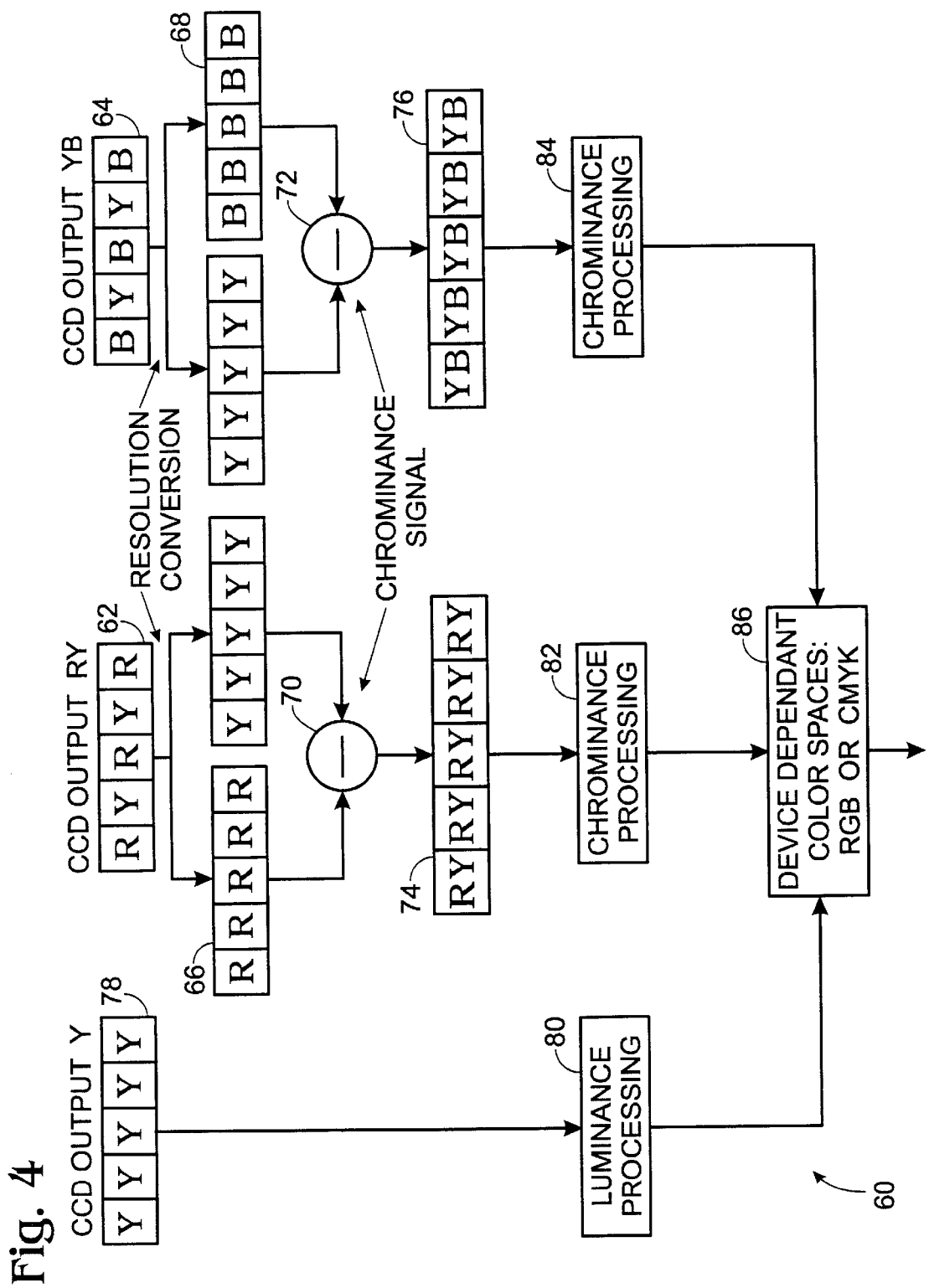
FIG. 4 illustrates the algorithm used to derive registration-insensitive color image from captured RY, Y, and BY signals.

FIG. 4 illustrates the process and processing mechanism used to derive registration-insensitive color image from captured RY, Y, and BY signals, generally at 60. The half resolution RY signal 62, and half resolution BY signal 64, from sensor rows 34, 36, respectively, are first resolution enhanced to full resolution using linear interpolation, blocks 66, 68, respectively. The full resolution interpolated R and Y, or Y and B signals are sent to the color difference operators 70, 72, to derive the RY full resolution chrominance signals 74, and the BY full resolution chrominance signal 76. Output 78 from sensor row 34 is processed, block 80, as are chrominance signals 74, 76, blocks 82, 84, respectively. Alternately, a half-resolution chrominance signal may be an input to other parts of an imaging system, such as in a compression scheme that uses sub-sampled color differencing images.

The luminance-chrominance-chrominance (LCC) signals are converted by an output mechanism 86 to RGB for display or CMYK for printing. In most cases, image processing such as filtering, tone scale enhancement, etc are applied to the LCC image before it is displayed or printed, after output mechanism 86 processing.

Figure 5:
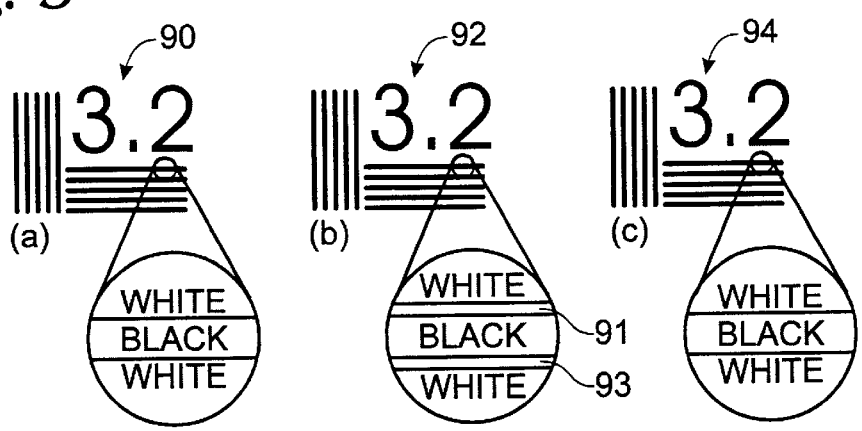
FIG. 5 depicts color registration in a RY-Y-BY based scanner.

FIG. 5 shows the simulated results using the RY-Y-BY sensor design and method of the invention. FIG. 5a is an original image 90, FIG. 5b represents a two pixel shift vertically in a green component in green in a RGB scanner 92, and FIG. 5c represents a two-pixel shift in luminance in RYB scanner using preferred embodiment 94. The color fringing is eliminated for black text, and the text is as sharp as the original in FIG. 5c. Color fringing, however, remains visible in FIG. 5b, wherein an upper fringe 91 is a magenta artifact and a lower fringe 93 is a green artifact.

Figure 6:
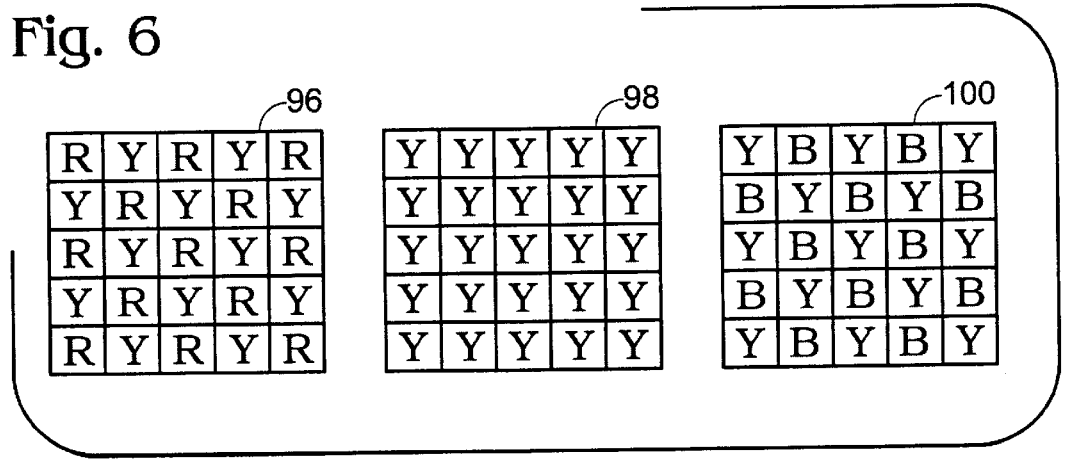
FIG. 6 depicts application of the method of the invention to a 2D camera.

Referring now to FIG. 6, it is possible to use other color filters to capture the chrominance signal; e.g., one can use RG instead of RY and GB instead of BY. This method can also applied to reduce the color registration effect 2D cameras using three CCDs. It is possible that one CCD 96 is used to capture red and luminance, another CCD 98 is used to capture luminance at the full resolution, and the third CCD 100 is used to capture luminance and blue.

Thus a system and method to reduce color artifacts has been disclosed, along with a variation thereof. It will be appreciated that further modifications and variation may be made thereto without departing from the scope of the invention as defined in the appended claims.

We claim:

1. A method for color registration in an image capturing device comprising:

arranging multiple rows and multiple columns of pixel capturing elements in a sensor array; capturing a luminance component of the image in a row and in all columns thereof at a first resolution and generating a luminance output signal therefrom; capturing in another row and in alternate columns thereof, a first color component at one-half the first resolution capturing a luminance component in the remaining columns thereof, and generating a first color-luminance output signal therefrom; and capturing, in another row and in alternate columns thereof, a second color component at one-half the first resolution, capturing a luminance component in the remaining columns thereof, and generating a second color-luminance output signal therefrom.

2. The method of claim 1 which further includes converting the first and second color-luminance signals to full resolution; output processing all of the full resolution signals to form an output signal.

3. The method of claim 2 wherein said output processing includes processing the full resolution signals to form a RGB output signal.

4. The method of claim 2 wherein said output processing includes processing the full resolution signals to forms a CMYK output signal.

5. A system for color registration in a image capturing device comprising:

a sensor array having multiple rows and multiple columns of pixel capturing elements therein, wherein alternate rows have pixel capturing elements for capturing a first resolution luminance component of the image; another row and alternate columns thereof have pixel capturing elements for capturing a first color component at one-half the first resolution, and which contain pixel capturing elements in the remaining columns thereof for capturing a luminance component thereof; and another row and alternate columns thereof have pixel capturing elements for capturing a half resolution second color component at one-half the first resolution, and which contain pixel capturing elements in the remaining columns thereof for to capturing a luminance component thereof.

6. The system of claim 5 which includes a processing mechanism for transforming the half resolution first and second color components into full resolution color components.

7. The system of claim 5 which includes and output mechanism for providing a RGB output.

8. The system of claim 5 which includes and output mechanism for providing a CMYK output.

* * * * *